UNITED STATES PATENT OFFICE.

MAX MATTHIAS HAFF, OF NEW YORK, N. Y., ASSIGNOR TO THE AMPERE ELECTRO-CHEMICAL COMPANY, OF JERSEY CITY, NEW JERSEY, A CORPORATION OF NEW JERSEY.

SEPARATION OF THE CONSTITUENTS OF COMPLEX SULFID ORES.

SPECIFICATION forming part of Letters Patent No. 695,306, dated March 11, 1902.

Application filed June 29, 1901. Serial No. 66,589. (No specimens.)

*To all whom it may concern:*

Be it known that I, MAX MATTHIAS HAFF, a subject of the King of Great Britain and Ireland, residing at New York, in the county and State of New York, have invented certain new and useful Improvements in the Separation of the Constituents of Complex Sulfid Ores, of which the following is a specification.

This invention relates to the utilization of complex ores consisting of mixed sulfids of zinc, lead, and other metals, which do not yield readily to the usual metallurgical methods so as to enable a full and complete separation of the constituent metals. By fusion and roasting with alkali-metal sulfates these complex sulfids may be converted into sulfates, with exception of the iron, which passes into ferric oxid, and by lixiviation the zinc sulfate may then be separated from the lead sulfate. The resulting solution of zinc sulfate and sodium sulfate is, however, not salable as such, and the separation of these bases, while theoretically practicable, is not commercially practicable by ordinary means, as any of the usual precipitates for the zinc will give a new mixed solution involving just so much waste. To overcome this difficulty, it is desirable to precipitate the zinc by an agent, which will itself be precipitated at the same time, so as to leave the sodium sulfate alone in solution, thus enabling the recovery and reutilization of the latter. Such an agent is found in barium hydrate, which when added in proper proportion to the mixed solution causes a complete precipitation of both the zinc and the barium as zinc hydrate and barium sulfate, respectively. As an agent for the conversion of the sulfid into sulfate I prefer to use acid sodium sulfate; but the normal sulfate can also be used, with, however, an inferior result. The acid or normal sulfate of any of the other fixed alkalies may also be used. In case the normal sulfate is used the conversion is aided by the tendency of the sulfate to break up under these conditions.

The process is carried out as follows: Two parts of the finely-ground ore containing the mixed sulfids are mixed with six to seven parts of acid sodium sulfate or generally of acid sulfate of a fixed alkali. The mixture is then heated in a suitable roasting-furnace to such a temperature as will cause the iron sulfate formed to be decomposed, the reactions in this operation being as follows:

$$ZnS+2NaHSO_4=ZnSO_4+Na_2SO_4+H_2S.$$

$$PbS+2NaHSO_4=PbSO_4+Na_2SO_4+H_2S.$$
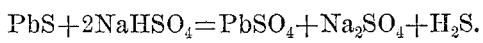

$$H_2S+3O=SO_2+H_2O.$$

If iron sulfid is present, it will be converted into ferric oxid, as follows:

$$FeS_2+2NaHSO_4+2O=\\FeSO_4+Na_2SO_4+SO_2+H_2S.$$
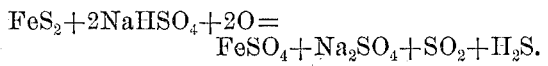

$$2FeSO_4+O=F_2O_3+2SO_2.$$
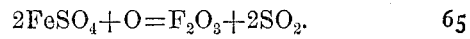

The mass is taken from the furnace and placed in a lixiviating-vat, wherein it is leached with water, thus extracting all the zinc sulfate and sodium sulfate, which enter into solution, leaving the lead sulfate and the ferric oxid in the residuum, from which they may be recovered by the usual metallurgical processes. The mixed solution of zinc sulfate and sodium sulfate is drawn off and treated with sufficient barium hydrate to just precipitate all of the zinc present according to the following reaction:

$$ZnSO_4+BaH_2O_2=ZnH_2O_2+BaSO_4.$$
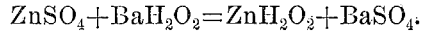

This precipitate is separated from the solution of sodium sulfate by decanting or filtering and washing and forms a product which is useful as a pigment and salable as such. The normal sodium sulfate remaining in the solution may then be treated with sulfuric acid to convert it into acid sodium sulfate. The sulfuric acid required for this purpose may be derived from the roasting operation above described. In fact, the sodium salt may be considered only as a carrier for the sulfuric acid, the latter being derived eventually from the ore itself, so that a given quantity of sodium sulfate can convert an indefinite quantity of the ore.

If gold and silver be present in the ore, the gold will pass along with the iron and lead and may be recovered from the lead after reduction, while the silver will pass with the zinc and may be precipitated by zinc chlorid previous to precipitation of the zinc. The amount of zinc chlorid so added would not in general be enough to enter seriously into the subsequent reactions.

Having thus described my invention, the following is what I claim as new therein and desire to secure by Letters Patent:

1. The process which consists in heating mixed sulfids of zinc and lead with sulfate of an alkali metal, treating the resultant mass with a dissolving agent to dissolve the zinc sulfate and alkali-metal sulfate, while leaving the lead sulfate undissolved and adding barium hydrate to the mixed solution of zinc sulfate and alkali-metal sulfate to precipitate zinc hydrate and barium sulfate.

2. The process which consists in heating mixed sulfids of zinc and lead with acid sulfate of an alkali metal, treating the resultant mass with water to dissolve the sulfates of zinc and alkali metal, and adding barium hydrate to the resulting solution to precipitate zinc hydrate and barium sulfate, leaving the alkali-metal sulfate in solution.

3. The process which consists in heating mixed sufids of zinc and lead with acid sulfate of an alkali metal, treating the resultant mass with water to dissolve the sulfates of zinc and alkali metal, adding barium hydrate to the resulting solution to precipitate zinc hydrate and barium sulfate, leaving the alkali-metal sulfate in solution, recovering the alkali-metal sulfate, treating it with sulfuric acid to convert it into acid sulfate and utilizing the latter in a repetition of the process.

4. The process which consists in roasting mixed sulfids of zinc and lead with acid sulfate of an alkali metal, thereby producing sulfates of lead and zinc and sulfur dioxid, producing sulfuric acid from the latter by usual means, treating the sulfates of zinc, lead and alkali metal with water to dissolve the sulfates of zinc and alkali metal, adding barium hydrate to the solution to precipitate zinc hydrate and barium sulfate, recovering the alkali-metal sulfate from the solution, and treating it with the sulfuric acid produced from the roasting process to obtain acid sulfate of the alkali metal for utilization in repetition of the process.

MAX MATTHIAS HAFF.

Witnesses:
J. GREEN,
A. P. KNIGHT.